United States Patent
Karlsson et al.

[11] Patent Number: 5,967,107
[45] Date of Patent: Oct. 19, 1999

[54] FLAP VALVE FOR INTAKE SYSTEM FOR AN INTERNAL COMBUSTION ENGINE

[75] Inventors: Jan A G Karlsson, Västra Frölunda; Anders H Petrén, Kungälv, both of Sweden

[73] Assignee: AB Volvo, Göteborg, Sweden

[21] Appl. No.: 09/101,133

[22] PCT Filed: Dec. 30, 1996

[86] PCT No.: PCT/SE96/01763

§ 371 Date: Oct. 1, 1998

§ 102(e) Date: Oct. 1, 1998

[87] PCT Pub. No.: WO97/24517

PCT Pub. Date: Jul. 10, 1997

[30] Foreign Application Priority Data

Dec. 29, 1995 [SE] Sweden ................................. 9504710

[51] Int. Cl.$^6$ .................................................. F02B 27/02
[52] U.S. Cl. .................. 123/184.55; 123/184.49
[58] Field of Search ..................... 123/184.42, 184.43, 123/184.49, 184.41, 184.48, 184.53, 184.55, 184.59

[56] References Cited

U.S. PATENT DOCUMENTS

| | | | |
|---|---|---|---|
| 5,105,774 | 4/1992 | Piccini | 123/184.55 |
| 5,309,883 | 5/1994 | Pischke | 123/184.55 |
| 5,787,851 | 8/1998 | Sakurai et al. | 123/184.55 |
| 5,787,852 | 8/1998 | Muramatsu et al. | 123/184.55 |
| 5,813,380 | 9/1998 | Takahashi et al. | 123/184.55 |

FOREIGN PATENT DOCUMENTS

| | | |
|---|---|---|
| 0471885A1 | 2/1992 | European Pat. Off. . |
| 4317563A1 | 12/1993 | Germany . |
| 500730 | 8/1994 | Sweden . |
| 2239899 | 7/1991 | United Kingdom . |

*Primary Examiner*—Marguerite McMahon
*Attorney, Agent, or Firm*—Samuels, Gauthier & Stevens, LLP

[57] ABSTRACT

An intake system for internal combustion engine comprises a separate intake manifold for each engine cylinder with a first manifold portion extending between the intake valves of the respective cylinder and a first air distribution chamber, and a second manifold portion forming a connection between the first air distribution chamber and a second air distribution chamber. For each cylinder there is arranged a valve which in a first position connects the intake manifold portions and in a second position opens these intake manifold portions towards the first air distribution chamber, in such a way that the valves are simultaneously acutuatable between these two positions by means of control means with regard to the motor speed.

The following is an examiner's statement of reasons for allowance: The prior art fails to teach or fairly suggest the claimed invention as a whole including a first manifold portion extending between the intake valve(s) of the respective cylinder and a first air distribution chamber, and a second manifold portion forming a connection between the first air distribution chamber and a second air distribution chamber, said first air distribution chamber having a valve arranged for each cylinder, said valve having a first position which connects the intake manifold portions and a second position which opens these intake manifold portions towards the first air distribution chamber, in such a way that the valves are simultaneously actuatable between these two positions by means of control means with regard to the motor speed, characterized in that for each cylinder there is arranged a valve body designed as a connector pipe, which is rotatable about an axle and which in the first position forms a tight connection between the two manifold portions and in a second position is located outside the ends of the manifold portions, so that these are exposed.

7 Claims, 3 Drawing Sheets

FLAP VALVE FOR INTAKE SYSTEM FOR AN INTERNAL COMBUSTION ENGINE

TECHNICAL FIELD

The present invention refers to a valve arrangement for intake systems in an internal combustion engine, said intake system comprising a separate intake manifold for each engine cylinder with a first manifold portion extending between the intake valve/-valves of the respective cylinder and a first air distribution chamber, and a second manifold portion forming a connection between the first air distribution chamber and a second air distribution chamber, at which a valve arranged for each cylinder in a first position of use connects the intake manifold portions and in a second position of use opens these intake manifold portions towards the first air distribution chamber, in such a way that the valves are simultaneously actuatable between these two positions uf use by means of control means with regard to the motor speed.

BACKGRUND OF THE INVENTION

In active intake systems for multiple cylinder internal combustion engines controllable valve throttles are used for adapting the length of the intake channels to the working conditions of the engine. This solution admits the utilization of the resonance frequency of the intake system for an advantageous volumetric efficiency within different motor speed areas.

For example EP-A-0492122 discloses an intake system with an air distribution chamber, which is connected to the intake valves of the motor by means of intake manifolds. Extension pipes ä r moveably mounted on an axle within the air distribution chamber, in such a way that the manifolds can shift between an active position in which they connect as extensions to the intake manifolds, and a passive position in which the extension pipe ends are located at a distance from the intake manifold ends. This known solution is mainly adapted for applications where the extension pipes can be relatively short.

In intake systems where a greater change in length of the intake channels is needed when shifting from one to another position of use, the construction according to EP-A-0492122 will be very space requiring. When designing the engine house of a private car one must consider that many components and system have to be packed together in a narrow space and at the same time be accessible for maintenance and repair. It is therefore advantageous if the intake system can be made compact. Besides the known solution in such case involves that a relatively big mass has to be displaced very quickly from one position to another. This calls for high demands on the operating mechanism including the bearings. A condition for the invention is besides that it shall cope with high demands on the reliability.

OBJECT OF THE INVENTION

The object of the present invention is therefore to obtain a valve arrangement which provides a compact construction of the intake system and which besides is simple to shift over from one functional position to another.

SOLUTION OF THE PROBLEM

This has accordning to the invention been obtained in an intake system described above, by the fact that for each cylinder there is arranged a valve body designed as a connector pipe, which is rotatable about an axle and which in the first position of use forms a tight connection between the two manifold portions and in a second position of use is located outside the ends of the manifold portions, so that these are exposed.

Preferred embodiments of the invention are disclosed in the subclaims.

DESCRIPTION OF THE DRAWINGS

The invention will below be described more in detail with reference to the embodiments shown in the accompanying drawings, in which FIG. 1 schematically shows an intake system with a valve arrangement according to the invention, which is adapted to a six cylinder internal combustion engine.

DESCRIPTION OF EMBODIMENTS

Figure 1:
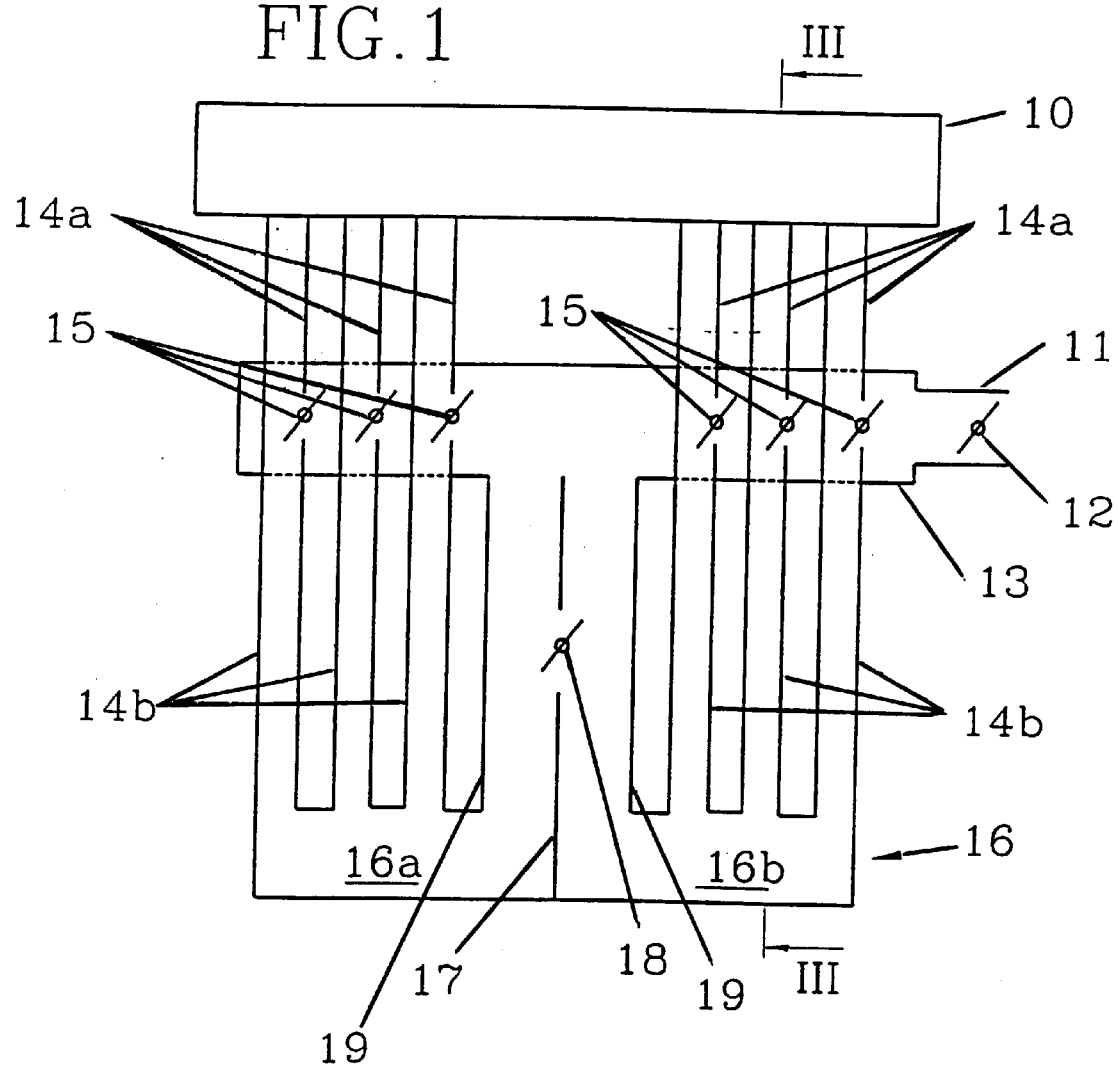

FIG. 1 shows an intake system for a six cylinder internal combustion engine 10. The intake system comprises an outlet socket 11 from an air filter housing not shown. In the outlet socket there is arranged a gas throttle 12, for regulating the flow volume of the purified intake air.

The outlet socket 11 ends in an air distribution chamber 13, which is placed in connection to inlet manifolds 14a, 14b extending with a first portion 14a between the inlet valve/valves of each motor cylinder and a clack valve 15 in the air distribution chamber 13, and with a second portion 14b extends between the clack valve 15 in the first air distribution chamber 13 and a second air distribution chamber 16. Said chamber 16 is divided by means of a partition wall 17 in two acoustically substantially equal volumes 16a, 16b. The partition wall 17 is provided with an openable valve throttle 18, which makes it possible for the two volumes 16a, 16b to be acoustically connected to a common volume.

Both volumes 16a, 16b of the chamber 16 are each connected to the chamber 13 by means of a resonance tube 19. The resonance tubes 19 have suitably the same acoustic length as the portions 14b of the intake manifolds, which extend between the clack valves 15 and the chamber 16. On the other hand the acoustic cross section area of the resonance tubes 19 differs from the acoustic cross section area of the intake manifolds 14a, 14b. The clack valves 15 are preferably placed on a location at about one third of the distance from the motor 10 to the chamber 16.

The throttle 18 is actuateable between closed and open position by means of a micro processor (not shown). This processor receives input data based on the motor speed, so that a switch over from one position to the other is made automatically at a certain motor speed. In a corresponding way the clack valves 15 are simultaneously actuatable between open and closed position by means of corresponding control members with respect to the motor speed.

Figure 2:
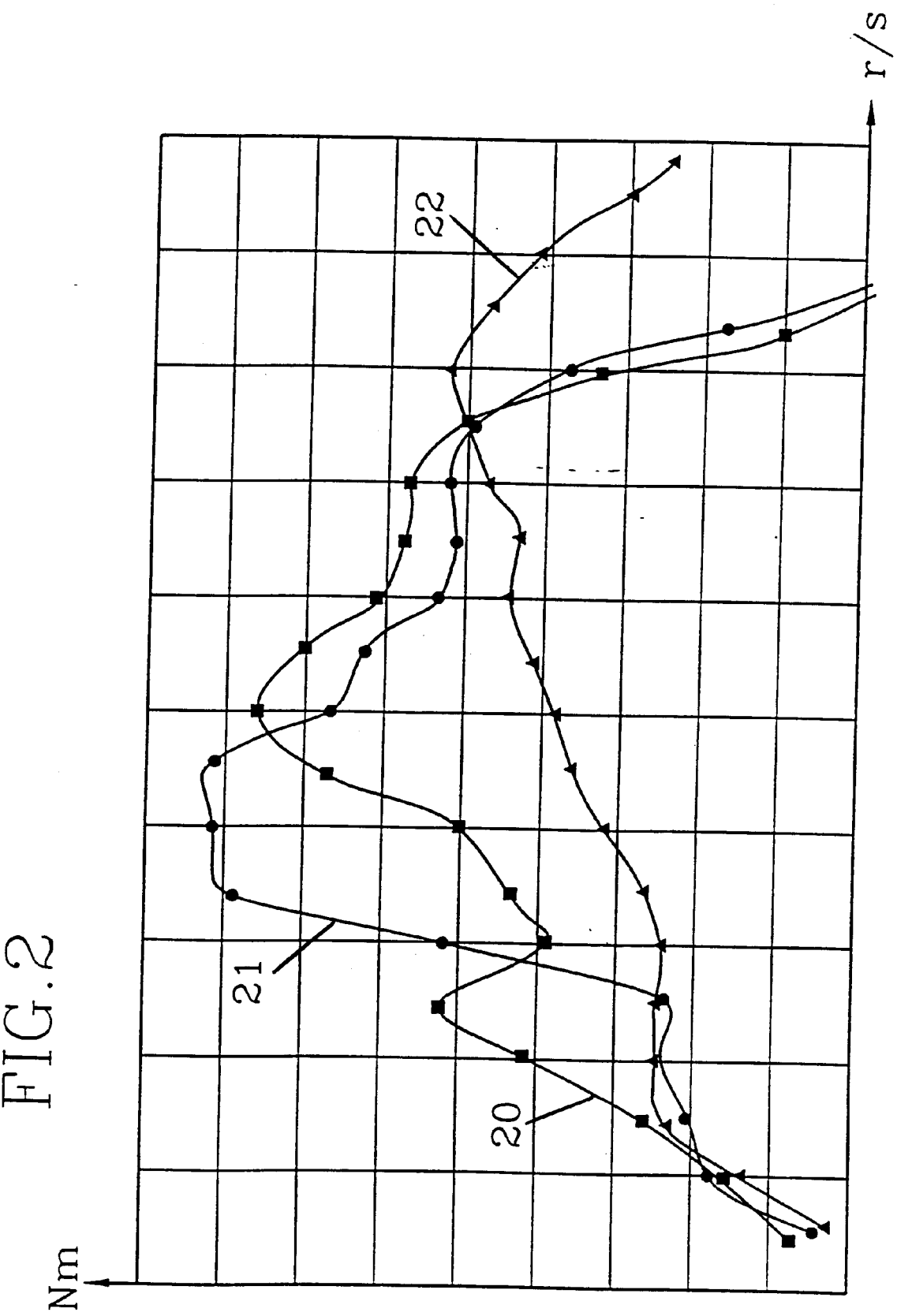
FIG. 2 is a diagram illustrating the technical effect of the intake system according to FIG. 1.

FIG. 2 illustrates in diagram form the function of the intake system, at which the horizontal axis denotes increasing motor speed r/s and the verticla axis denotes increasing torsional moment Nm.

Within a low motor speed register, which is illustrated with the graph 20, there is achieved an advantageous torsional moment with closed clack valves 15 and closed throttle 18. At this the period of oscillation of the air volume in the intake system is determined by the total acoustic length of the intake manifolds 14a plus 14b, the air volume in the chamber section 16a and 16b resp., the air volume in the respective resonance tube 19 and the air volume in the chamber 13.

Within an intermediate motor speed register, which is illustrated with the graph 21, there is achieved an advantageous torsional moment with the throttle 18 open. At this the period of oscillation of the air volume in the intake system is detemined by the added acoustic length of the intake manifolds 14a and 14b.

Within a higher motor speed, which is illustrated with the graph 22, there is achieved an advantageous torsional moment with the clack valves 15 and the throttle 18 open. The period of oscillation of the air volume in the intake system is at this determined by the acoustic length of the intake manifolds 14a.

As is seen from FIG. 2 the regulation condition according to the graph 20 can be used, after the peak of the graph 21 has been passed, at which a more even transition to the graph 22 is obtained.

Figure 3:
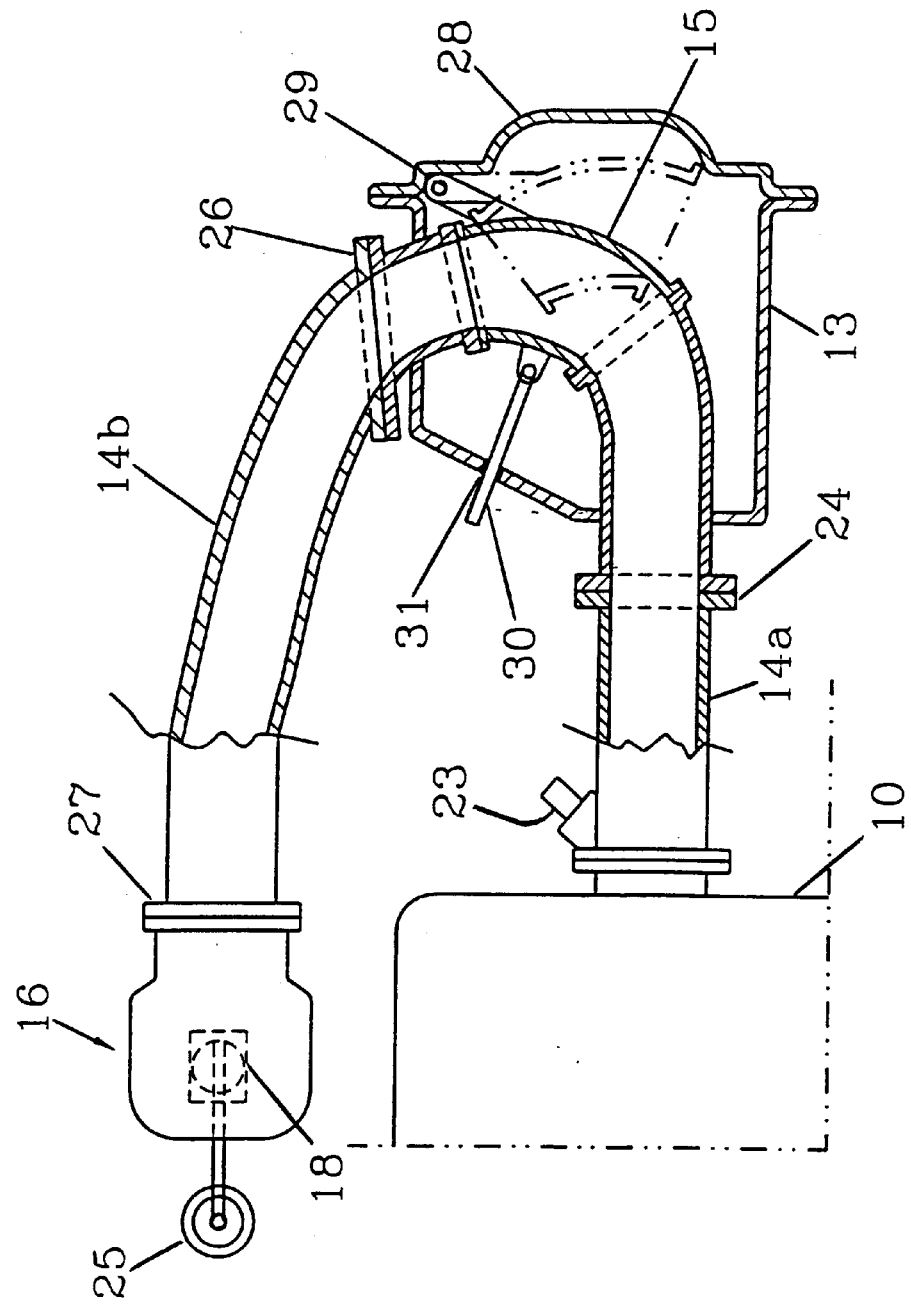
FIG. 3 is a section according to the line III—III in FIG. 1, which shows a preferred embodiment of the intake system with the valve arrangement according to the invention.

FIG. 3 shows a vertical section through a variant of the intake system shown in FIG. 1, which for space reasons has been bent upwards in U-shape, so that the air distribution chamber 16 is placed above the cylinder head of the motor 10.

The first portion 14a of each intake manifold is provided with a fuel injection nozzle 23. For manufacturing reasons the tube portions 14a is provided with a joint at 24 which is placed before the inlet of the tube in the air distribution chamber 13. The end of the tube portion 14a within the chamber 13 is designed in such a way that it sealingly connects to the valve body 15 which is designed as a curved tube portion, when it is located in the position shown with continuous lines in FIG. 3.

The other portion 14b of each intake manifold connects in a corresponding way to the opposite end of the valve body 15, and extends in an arched shape obliquely upwards to the second air distribution chamber 16. A control unit is placed at the chamber 16 for controlling the throttle 18. For manufacturing reasons the tube portion 14b is provided with joints at 26 and 27 on the outside of the air distribution chamber 13 and adjacent the air distribution chamber 16.

The air distribution chamber 13 comprises a cover 28 which is provided with bearings for an axle 29, on which the valve bodies 15 are rotatably mounted, so that they can pivot from the position shown with continuous lines in FIG. 3, to the position shown with broken lines in the same figure. This means that valves bodies no longer form a connection between the portions 14a, 14b of the intake manifolds, so that the intake system works in accordance with the graph in FIG. 2.

The pivot axle 29 is placed on the outside of the curved connector pipes, close to the end of the valve body 15 which is connectable to the tube portion 14b. This means that the valve body 15 can completely expose the opening to the tube portion 14a, so that the valve body does not disturb the air flow into the tube 14a. The operation of the valve body is simultaneously performed by means of a push rod 30 which extends through a sealing 31 in the wall of the chamber 13. The return of the valve body 15 is also simultaneously performed by a spring (not shown).

The invention is of course not limited to the shown embodiment, but a plurality of modifications are possible within the scope of the following claims. For example other means than the described may be used for operating the clack valves 15. The throttle 18 can be placed in different ways than shown in FIG. 3. According to the invention there can of course be used other types of active intake systems than the one shown, which for example can be adapted to four cylinder motors.

We claim:

1. A valve arrangement for intake systems in an internal combustion engine, said intake system comprising a separate intake manifold for each engine cylinder with a first manifold portion extending between the intake valve(s) of the respective cylinder and a first air distribution chamber, and a second manifold portion forming a connection between the first air distribution chamber and a second air distribution chamber a valve arranged for each cylinder, said valve having a first position which connects the intake manifold portions and a second position which opens these intake manifold portions towards the first air distribution chamber, in such a way that the valves are simultaneously actuatable between these two positions by means of control means with regard to the motor speed, characterized in that for each cylinder there is arranged a valve body designed as a connector pipe, which is rotatable about an axle and which in the first position forms a tight connection between the two manifold portions and in a second position is located outside the ends of the manifold portions, so that these are exposed.

2. A valve arrangement according to claim 1, characterized in, that each connector pipe forms a channel portion which is curved in one plane.

3. A valve arrangement according to claim 2, characterized in, that is mounted together with other valve bodies on a common pivot axle extending across said plane.

4. A valve arrangement according to claim 3, characterized in, that the pivot axle is placed on the outer side of the curved connector pipes close to one end thereof.

5. A valve arrangement according to claim 1, characterized in, that the operation of the valve(s) body(s) is made by means of at least one push rod acting thereupon against the action of a spring.

6. A valve arrangement according to claim 1, characterized in, that the second air distribution chamber is divided into two acoustically substantially equal volumes.

7. A valve arrangement according to claim 6, characterized in, that between the first and the second air distribution chamber there are arranged two resonance tubes and, that in an opening between these there is arranged a valve throttle for acoustically connecting or separating the two volumes.

* * * * *

UNITED STATES PATENT AND TRADEMARK OFFICE
CERTIFICATE OF CORRECTION

PATENT NO : 5,967,107
DATED : October 19, 1999
INVENTOR(S) : Richard L. Shown

It is certified that error appears in the above-identified patent and that said Letters Patent are hereby corrected as shown below:

IN THE CLAIMS:

Claim 6, column 6, line 36: after "combination of claim" and before "wherein the liquid", delete "5" and insert –2–.

Claim 7, column 6, line 42: after "combination of claim" and before "wherein the liquid", delete "2" and insert –5–.

Signed and Sealed this

Seventeenth Day of April, 2001

NICHOLAS P. GODICI

*Attest:*

*Attesting Officer*  *Acting Director of the United States Patent and Trademark Office*